United States Patent [19]

Sacher

[11] Patent Number: 4,741,614

[45] Date of Patent: May 3, 1988

[54] PROJECTED DEVICE

[76] Inventor: Friedrich-Josef Sacher, Agnesstrasse 52a, D-5210 Troisdorf, Fed. Rep. of Germany

[21] Appl. No.: 45,852
[22] PCT Filed: Sep. 1, 1986
[86] PCT No.: PCT/EP86/00507
§ 371 Date: Apr. 28, 1987
§ 102(e) Date: Apr. 28, 1987
[87] PCT Pub. No.: WO87/01471
PCT Pub. Date: Mar. 12, 1987

[30] Foreign Application Priority Data

Sep. 3, 1985 [DE] Fed. Rep. of Germany ....... 8525073

[51] Int. Cl.⁴ .................... G03B 23/10; G03B 23/16
[52] U.S. Cl. ..................... 353/94; 353/101; 353/110
[58] Field of Search ............... 353/94, 110, 101

[56] References Cited

U.S. PATENT DOCUMENTS 4,627,696 12/1986 Sacher ........................ 353/110

FOREIGN PATENT DOCUMENTS 141698 6/1951 Australia ..................... 353/94
527915 4/1954 Belgium ...................... 353/94
2243767 3/1974 Fed. Rep. of Germany ...... 353/110
523344 4/1955 Italy ......................... 353/94

Primary Examiner—Harry N. Haroian
Attorney, Agent, or Firm—Michael J. Striker

[57] ABSTRACT

The invention relates to a projector device comprising a group of at least four projectors (2, 4 and 8) for transparencies, which in accordance with the arrangement of projectors are arranged in groups of a plurality of sectors of a transparency carrier disk (7) able to turn about its center, the lamps (2) of projectors being arranged on a common lamp carrier (3), the condensors (4) of the projectors being arranged on a common condensor carrier plate (5) and the objectives (8) of the projectors being arranged on a common objective carrier plate (9) and the transparency carrier disk (7) is able to be driven via a central drive shaft (10). In order to ensure that such a projector device with preferably six projectors is able to to withstand mechanical strains, more especially those occurring in shipping, the condensor carrier plate (5) forms the wall of a box-like rigid chassis (6) consisting of cast metal, in which the lamp carrier (3) is replaceably arranged and in whose walls there are mutually parallel holes (12 and 24) for receiving the bearings (11) of the drive shaft (10) and to receive axially adjustable guide rods (23), on which the objective carrier plate (9) is secured.

16 Claims, 4 Drawing Sheets

PROJECTED DEVICE

BACKGROUND OF THE INVENTION

The invention takes as its starting point a projector device comprising a group of at least four projectors for transparencies, which in accordance with the arrangement of projectors are arranged in groups of a plurality of sectors of a transparency carrier disk able to turn about its center, the lamps of projectors being arranged on a common lamp carrier, the condensors of the projectors being arranged on a common condensor carrier plate and the objectives of the projectors being arranged on a common objective carrier plate and the transparency carrier disk is able to be driven via a central drive shaft. Projection devices of this type have been proposed in the PCT/EP83/00318.

Known multiple projectors are so designed that the lamp carrier, the condensor carrier and objective carrier are combined as a single means using a bridge spanning the transparency carrier disk. In the case of such means it is hard to so locate the lamps, the condensors and the objectives that they keep their accurate adjustment even after a long period of use, after frequent transport and after other mechanical stresses. It is furthermore hard to so mount the transparency carrier disk and its drive in such a manner that the transparency carrier disk and its drive function accurately after heavy stresses.

SUMMARY OF THE INVENTION

The object of the invention is to provide a projector device with at least four and preferably six projectors which is so sturdy that it may be shipped without any special care being taken and is able to stand up to heavy mechanical stresses.

This object is attained in accordance with the invention inasfar as the condensor carrier plate forms the wall of a box-like rigid chassis consisting of cast metal, in which the lamp carrier is replaceably arranged and in whose walls there are mutually parallel holes for receiving the bearings of the drive shaft and to receive axially adjustable guide rods, on which the objective carrier plate is secured.

The rigid chassis in accordance with the invention has the effect that the lamps, which are precisely aligned in the lamp carrier in relation to the condensors, are reliably held in the chassis and that furthermore a precise and mechanically resistant bearing system for the drive shaft of the transparency carrier disk and for the guide rods of the objective carrier plate is obtained. At the same time, the chassis made of cast metal such as cast aluminum or gray cast iron, offers the advantage that it is able to take up and conduct away the heat given off by the lamps.

There are guide grooves in the longitudinal side walls of the chassis so that the plate-like lamp carrier may be slipped into the chassis like a carriage. A terminal abutment ensures the precise positioning of the lamps in relation to the condensors. Underneath the lamp carrier the longitudinal side walls of the chassis form a venting duct through which the air current produced by a fan is able to flow.

The transparency carrier disk is driven via the drive shaft by a motor, which is attached to the chassis. For raising and lowering the objective carrier plate there is a reciprocating rod, which is mounted in a wall of the chassis and which is able to be moved upwards and downwards by way of a setting mechanism.

The chassis is set in a plastic housing, which is shut off by a housing cover, in which there is a recess through which the chassis may be inserted into the housing. The condensor carrier plate is in this respect arranged in the plane of the housing cover. The transparency carrier disk is located above the housing cover and is protected from dust by a cover hood. The latter as well has a recess in which a bellows may be inserted, which connects the cover hood with the objective carrier plate and thus protects the transparency carrier disk against dust despite the adjustability of the transparency carrier plate.

The projector device in accordance with the invention may be fitted with a translucent picture screen, which is arranged at a set, small distance from the objectives. In this version the device is more particularly suitable for use in shop windows, sales premises and the like for advertising shows.

The device in accordance with the invention may however also be used to project the images on a reflecting wall screen which is erected at a varying distance from the projector device.

Further improvements and developments of the invention will be seen from the dependent claims.

The following more detailed description is devoted to working embodiments of the invention with reference to the drawings.

DESCRIPTION OF THE PREFERRED EMBODIMENTS

Figure 1:
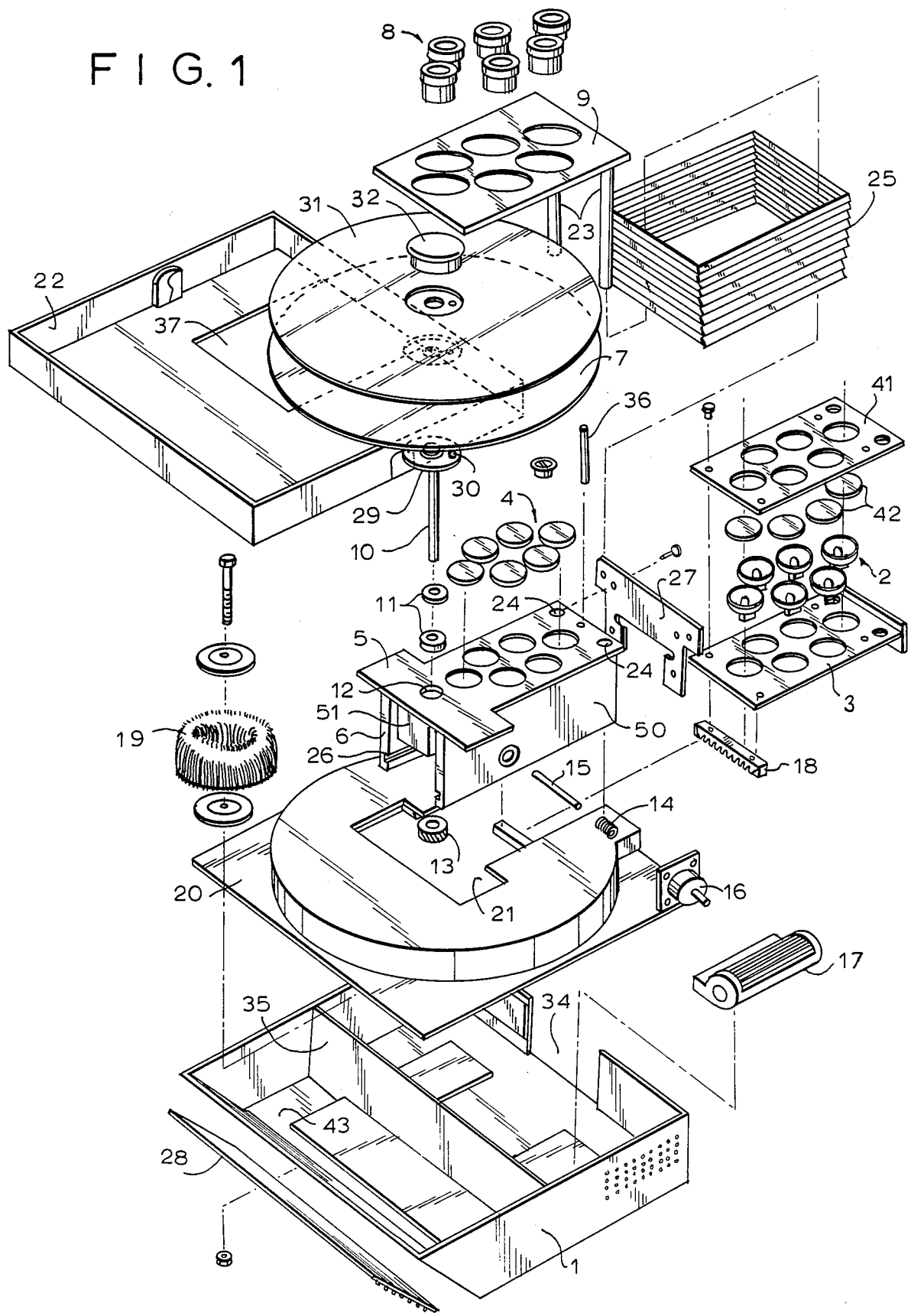
FIG. 1 is an illustrative representation of parts of the projector device in accordance with the invention.
Figure 2:
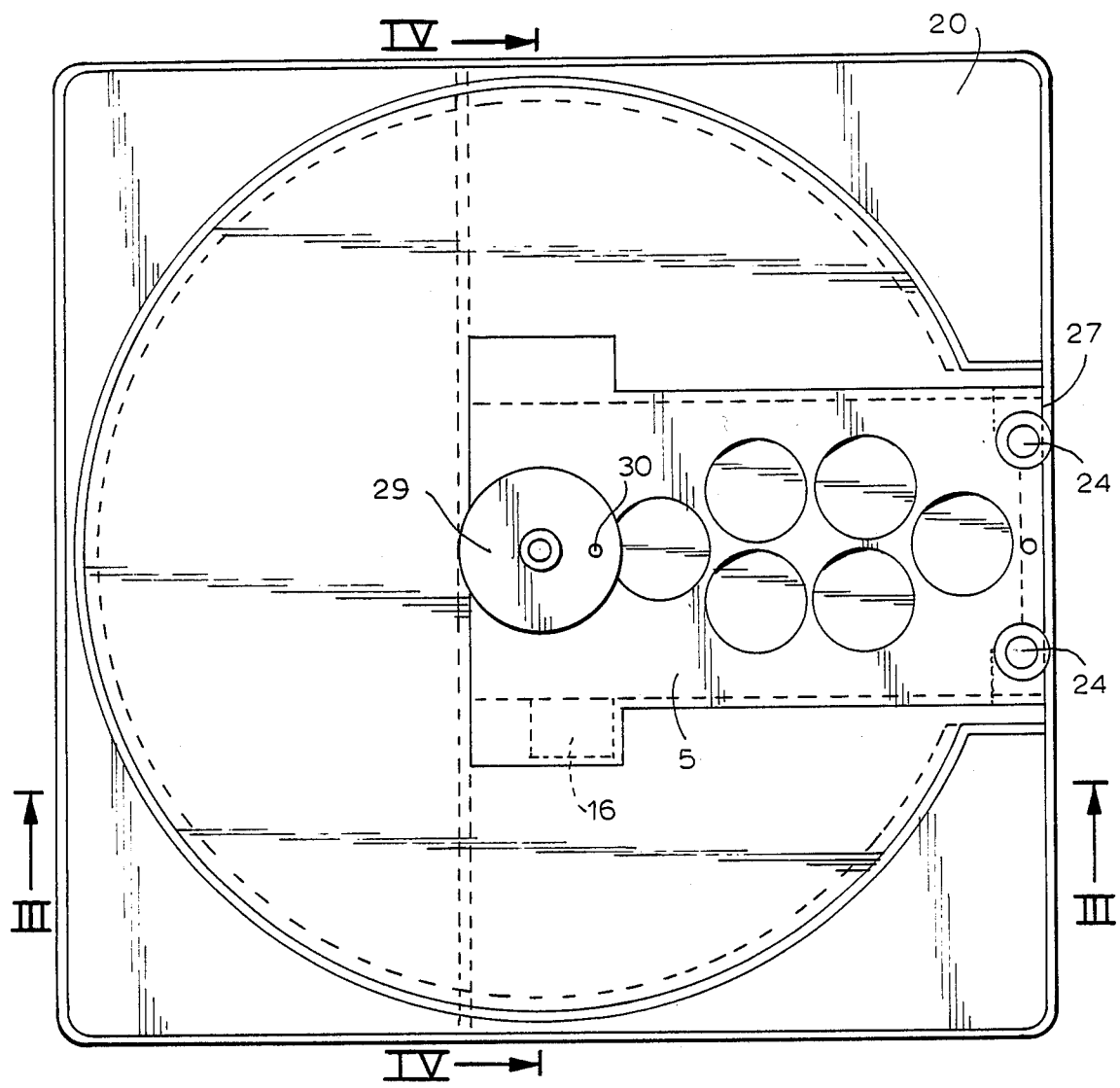
FIG. 2 is a plan view thereof.
Figure 3:
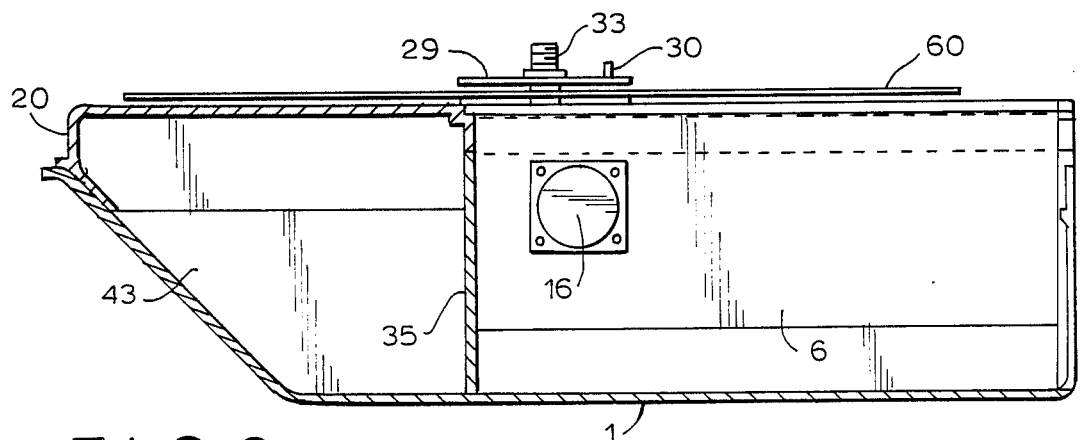
FIG. 3 is a view according to the section line III—III in FIG. 2.

The projector device shown in an exploded view in FIG. 1 has a housing 1 of plastic, in which control parts, not shown, for six projectors are accommodated, which consist of lamps 2, condensors 4 and objectives 8. The lamps 2 are inserted in a lamp carrier 3. The condensors 4 are inserted in a condensor carrier plate 5. The objectives 8 are inserted in an objective carrier plate 9. Between the condensors 4 and the objectives 8 a transparency carrier disk 7 is so arranged that a group of six transparencies, arranged in a sector of the transparency carrier disk 7, may be swung between the condensors 4 and the objectives 8 of the six projectors.

The condensor carrier plate 5 forms a wall of a rigid cast metal chassis 6. Besides recesses for the six condensors 5 this wall has mutually parallel holes 12 and 24. The hole 12 serves to receive bearing bushings 11 for a drive shaft 10, with the aid of which the transparency carrier disk 7 may be so rotated that a respective further sector of the transparency carrier disk 7 with a group of six transparencies may be aligned with the six projectors.

For driving the drive shaft 10 there is a stepper motor 16 which is secured on a side wall of the chassis 6 and which drives the drive shaft 10 via a worm 14 arranged on a worm shaft 15 and a worm wheel 13 secured to the drive shaft 10. At the outer end of the drive shaft 10 a carrier disk 29 with a drive pin 30 is fixed. The transparency carrier disk 7 is so secured to the carrier disk 29 that its pin hole fits over the drive pin 30. The transparency carrier disk 7 is covered by a transparent cover disk 31, which ensures that the precisely aligned transparencies are quite flat. The drive shaft 10 has a threaded pin 33 extending through the transparency carrier disk 7 and through the cover plate 31. A setting means 32 may be screwed on this threaded pin 33.

Figure 6:
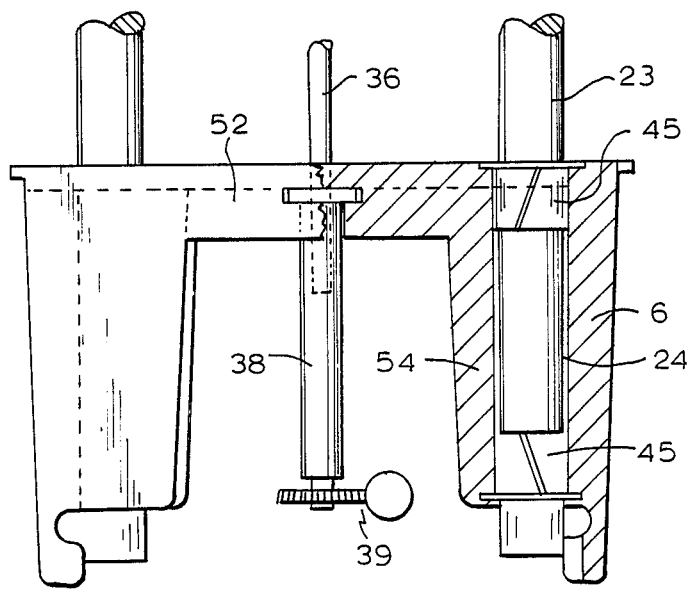
FIG. 6 is a sectional view of the bearing means of the axially adjusting guide rods of the objective carrier.

The chassis 6 with lamps 2, the lamp holder 3, the lamp plug member 18, the stepper motor 16, the fan 17, the transformer 19 and the control parts are arranged in the housing 1 underneath the housing cover 20. In the housing cover 20 there is a recess 21, which is occupied by the condensor carrier plate 5 of the chassis 6. Above the housing cover 20 there is the carrier disk 29 and the transparency carrier disk 7 together with the cover plate 31. Over the transparency carrier disk 7 and the cover plate 31 a cover hood 22 is arranged, in which there is a recess 37. A bellows 25 extends from the edge of the recess 37 to the edges of the objective carrier plate 9. The axially adjusting objective carrier plate 9 runs on the guide rods 23 in the holes 24 or bushings mounted therein. The axial setting or focusing operation is performed using a reciprocating rod 36, which is driven by means of nut 38 (see FIG. 6) for upward and downward motion in the chassis 6. Using a drive mechanism 39, which is operated from the outside using a handwheel or a motor, it is possible for the nut 38 to be turned about its axis and thus the reciprocating rod 36, which has a threaded rod, may be moved upwards and downwards. In this manner the objective carrier plate 9, guided via the guide rod 23 in the chassis, may be moved to set its distance from the condensors 4.

Despite the adjustability of the objectives 8 the transparency carrier disk 7 is protected from dust by the cover hood 22, the bellows 25 and the objective carrier plate 9. After moving up the objective carrier plate 9 and pulling off the cover hood 22 it is possible for the setting member 32 to be unscrewed from the threaded rod 33 at the top end of the drive shaft 10 and the transparency carrier disk 7 together with the cover plate 31 may be lifted clear of the carrier disk 29 and replaced by another transparency carrier disk with six groups of six transparencies each.

Figure 4:
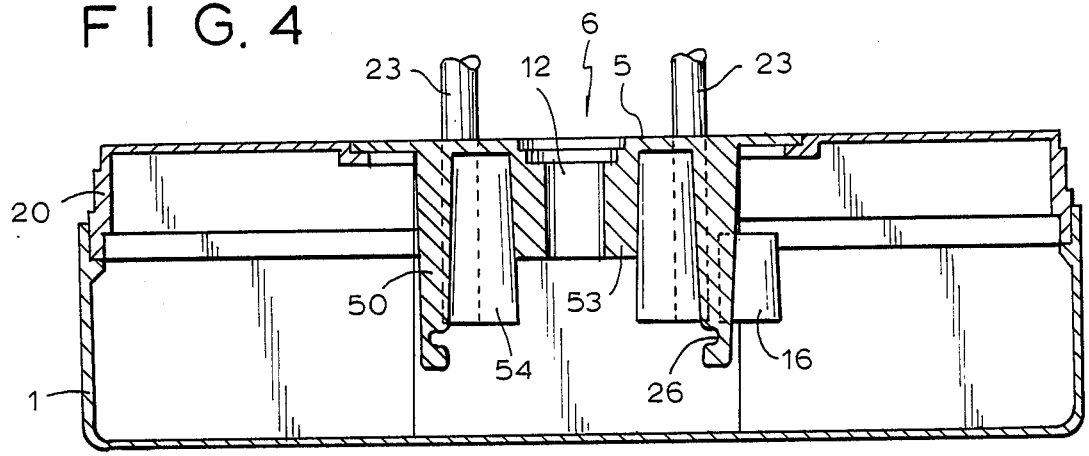
FIG. 4 is a view according to the section line IV—IV in FIG. 2.

The chassis 6 has a generally rectangular condensor carrier plate 5 in which six objectives 4 are inserted. Longitudinal side walls 50 extend generally at a right angle to this condensor carrier plate 5 and these walls are connected with each other by a front and a rear end wall 51 and 52. The hole 12s to receive the shaft bearing 11 are arranged in a cast-on part 53 (see FIGS. 4 and 5) in the longitudinal median plane of the chassis 6. The holes 24 for receiving the guide rods 23 or the guide bushings 45 are located in cast one parts 54, which are arranged in the corner parts of the rear end wall 52. On the inner sides of the longitudinal side walls 50 there are guide grooves 26 into which the lamp carrier 3 with the lamps 2 may be slid. At its back wall the housing 1 has a recess 34, which makes it possible, after insertion of the chassis 6 into the housing 1 and after securing or more especially sticking, the housing cover 20, for the lamp carrier 3 with the lamps 2 to be slid into the chassis 6.

As shown in FIG. 1 the lamps 2 are held in the lamp carrier by a screw-on securing plate 41 in the lamp carrier. Between the securing plate 41 and the edges of the reflectors of the lamps 2 there are asbestos rings 42. On the front end of the plate-like lamp carrier a lamp male member 13 is so secured by screws that after insertion of the lamp carrier 3 into the chassis 6 contact members of the lamp male member 18 fit into bushings which are arranged in the housing 1.

The drive shaft 10 is driven by a motor 16, which is screwed on a side wall 50 of the chassis 6 using flanges. Via a worm 14 and a worm wheel 13 it is coupled with the drive shaft 10. In order to make it possible for the chassis 6 together with the motor 16 screwed on it to be inserted through the housing cover 20 into the housing 1 itself, the recess 21 and accordingly also the condensor carrier plate 5 are so formed that this insertion is possible. The motor 16 is located in this respect under the lateral projecting wings of the condensor carrier plate 5.

The chassis 6 is secured in the housing 1 by means of a cover plate 27 which is screwed onto the rear end wall of the chassis 6 and on the rear wall of the housing 1. The cover plate 27 is so shaped that the lamp carrier 3 may be inserted into the chassis 6 and drawn out of same. The cover plate 27 is supported on the floor of the housing 1 and thus carries the chassis 6. There is a transverse wall 35 in the housing 1 which stiffens the housing 1 and which separates a housing part 43, in which more especially the electronic control circuitry of the device is arranged, from the other part of the housing. The housing cover 20 and accordingly the front part of the chassis 6 is supported on this transverse wall.

Figure 5:
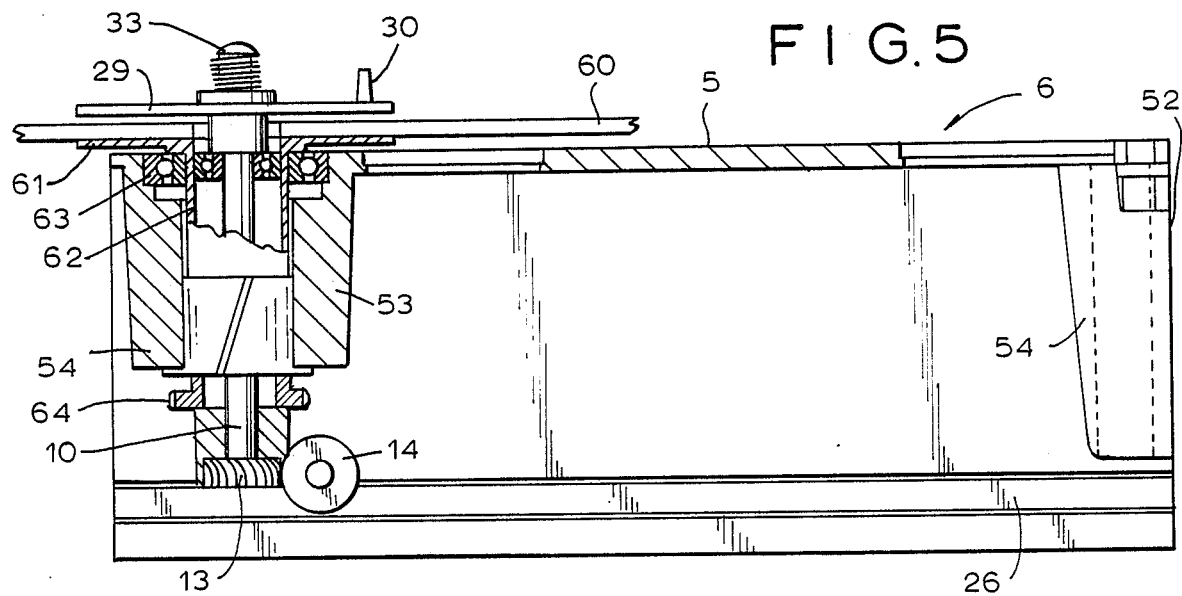
FIG. 5 is a sectional view of the bearing system of the drive shaft.

As will be seen from FIG. 5, it is possible to arrange a second carrier disk 61 parallel to the carrier disk 29, on which a special effects disk 60 is placed. The carrier disk 61 is bearinged in the housing 1 by way of a carrier disk sleeve 62 concentrically surrounding the carrier shaft and may be driven by a motor and a gearwheel 34. The drive may be in a manner similar to the drive of the drive shaft 10.

Figure 7:
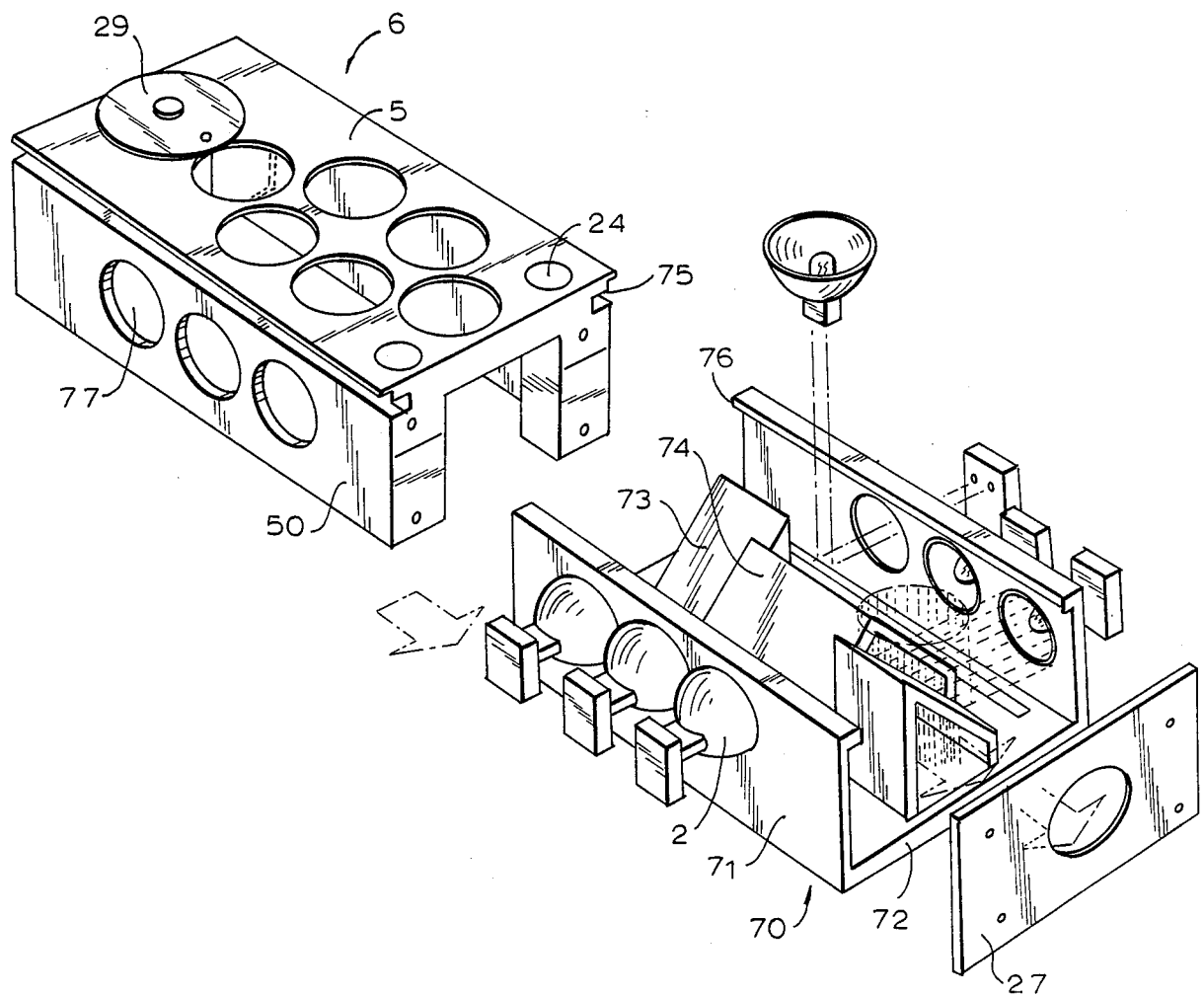
FIG. 7 is an illustrative view of the chassis and of the lamp carrier of another embodiment of the invention.

FIG. 7 shows a modified form of the chassis 6. In this case the lamps are not held in a plate-like lamp carrier but in side walls of a U-like lamp carrier 70. In the case of projectors with very powerful lamps 2 it may be an advantage not to arrange the lamps 2 in the chassis 6 but outside it. The lamps 2 are in this case fitted on the side walls 71 of the U-like lamp carrier 70 so that they shine through openings 77 in the longitudinal side walls 50 of the chassis 6 onto mirrors 73 and 74, which are arranged on the base 72 of the lamp carrier 70. The mirrors 73 and 74 cause the light from the lamps 2 to be deflected through 90° towards the condensors 4, which are inserted in the condensor carrier plate 5 of the chassis 6. There are guide rails 76 on the side walls 71 to fit into guide grooves 75 on the outer sides of the longitudinal side walls 50 of the chassis 6.

I claim:
1. A projector device, comprising:
a transparency carrier disc (7) having a plurality of sectors and a center, said transparency carrier disc (7) being rotatable about said center and being formed to accomodate plurality of transparencies on said sectors;

a plurality of projectors including a group of at least four lamps (2), a group of at least four condensers (4) and a group of at least four objectives (8);

means for carrying said projectors (2, 4, 8) and including a common lamp carrier (3) on which all of said lamps (2) are arranged, a common condenser carrier plate (5) on which all of said condensers (4) are arranged, and a common objective carrier plate (9) on which all of said objectives (8) are arranged;

a central drive shaft (10) drivably connected to said transparency carrier disc (7);

means for guiding said objective carrier plate (9) and including axially adjustable guide rods (23) secured to said objective carrier plate (9);

shaft bearings (11) arranged around said central drive shaft (10) so as to permit said central drive shaft (10) to be rotatably driven; and means for obtaining a precise and mechanically resistant bearing system for said central drive shaft (10) and for said guide rods (23) and including a box-like rigid chassis (6) with walls, said condenser carrier plate (5) forming one of said walls of said chassis (6), said lamp carrier (3) being replaceably held in said chassis (6), said walls of said chassis (6) being formed so as to have means for receiving said shaft bearings (11) and for receiving said guide rods (23) and including mutually parallel holes formed in at least one of said walls.

2. The projector device as defined in claim 1, wherein said box-like rigid chassis (6) is composed of cast metal so that heat generated by said lamps (2) conducts away through said chassis (6).

3. The projector device as defined in claim 1, wherein said walls of said box-like rigid chassis (6) are rectangular and include one front end wall (51), one rear end wall (52) opposite said front end wall (51), and two longitudinal side walls (50) opposite each other and arranged generally perpendicular to said condenser carrier plate (5).

4. The projector device as defined in claim 3, wherein said means for receiving said shaft bearings (11) includes a first receiving element (53) aligned with one of said mutually parallel holes (12) and receiving said shaft bearings (11), said first receiving element (53) being attached to said front end wall (51), said means for receiving said guide rods including a second receiving element (54) aligned with two of said mutually parallel holes (24) and receiving said guide rods (23), said second receiving element (54) being attached to said rear end wall (52).

5. The projector device as defined in claim 3, wherein said longitudinal side walls (50) have respective inner faces facing each other, each of said inner faces being formed with a groove (26), said groove (26) of each of said inner faces being arranged relative to each other and said lamp carrier (3) being formed so that said lamp carrier (3) slides into each said grooves (26).

6. The projector device as defined in claim 1; further comprising:

means for driving said central drive shaft (10) and including a motor (16) drivably connected to said central shaft (10) and secured to said chassis (6).

7. The projector device as defined in claim 6, further comprising:

means for drivably connecting said motor (16) and said central drive shaft (10) together and including a worm gear (14) and a worm wheel (13) drivably meshing with each other and drivably coupling said motor (16) with said central drive shaft (10), said walls of said box-like rigid chassis (6) including longitudinal side walls (50) arranged generally perpendicular to said condenser carrier plate (5), said motor (16) being secured to one of said longitudinal side walls of said chassis (6).

8. The projector device as defined in claim 3, wherein said front and rear end walls (51 and 52) each have a length shorter than that of each of said longitudinal side walls (50), said longitudinal side walls (50) being formed to define a venting duct underneath said said lamp carrier (3).

9. The projector device as defined in claim 1; further comprising:

a housing (1) with an open face; and a housing cover (20) closing said open face, said housing (1) and said housing cover (20) being formed and arranged relative to each other so as to define a space therebetween for accomodating electronic circuitry and control means for the projector, said condenser carrier plate (5) being arranged generally flush in said housing cover (20), said housing having a recess (34) through which said lamp carrier (3) with said lamps (2) is removably insertable into said chassis (6).

10. The projector device as defined in claim 9, wherein said housing cover (20) is composed of plastic.

11. The projector device as defined in claiim 9, wherein said projectors cooperate with each other to define a ray path; further comprising:

means for protecting said transparency carrier disc (7) from dust and including a cover hood (22) fitting over said transparency carrier disc (7) and having a recess (37) in said ray path of said projectors (2, 4, 8), said recess (37) having an edge, said protecting means also including a bellows (25) having one end sealingly connected with said edge of said recess (37), said protecting means further including said objective carrier plate (9), said objective carrier plate (9) having edges, said bellows having another end sealingly placed around said edges of said objective carrier plate (9).

12. The projector device as defined in claim 3, said lamp carrier (70) is U-like in cross-section and has two side walls (71) fitting with said longitudinal side walls (50) of said chassis (6), said lamps (2) being mounted in said two side walls (71) of said lamp carrier (70), said lamp carrier (70) having a base wall (72) between said two side walls (17) of said lamp carrier (70).

13. The projector device as defined in claim 12; further comprising:

mirrors (73, 74) attached to said base wall (72) and formed so as to be slidable into said chassis (6), said longitudinal side walls (50) of said chassis (6) having a plurality of openings (77), said mirrors (73, 74) being arranged to deflect light coming from said lamps (2) through said openings (77) in said longitudinal side walls (50) to said condensers (4) in said condenser carrier plate (5) of said chassis (6).

14. The projector device as defined in claim 12; further comprising:

means for slidably connecting said lamp carrier (70) and said chassis (6) together and including a plurality of guide rails (76) and a plurality of guide grooves (75), two of said guide rails (76) being formed on two of said side walls (71, 50) of said lamp carrier (70) and said chassis (6), two of said guide grooves (75) being formed on the other two of said side walls (71, 50) of said lamp carrier (70) and said chassis (6), said guide grooves (75) and said guide rails (76) being arranged to cooperate with each other so as to slidably inter-engage with each other and thereby slidably connect said lamp carrier (70) and said chassis (60) together.

15. The projector as defined in claim 14, wherein one of said guide rails (76) is arranged on each of said two side walls (71) of said lamp carrier (70) to direct inwardly toward each other, each of said longitudinal side walls (50) of said chassis (6) having an outer surface with one of said guide grooves (75) formed therein, each of said guide rails (76) being arranged to slidably inter-engage with a respective one of said guide grooves (75).

16. The projector as defined in claim 1, further comprising:
means for focussing said objectives (8) and including means for axially moving said objective carrier plate (9) relative to said condensers (4) while guiding said objective carrier plate (9) by said guide rods (23) in said chassis (6).

* * * * *